United States Patent [19]

Gaskill

[11] 4,410,550

[45] Oct. 18, 1983

[54] APPARATUS AND METHOD FOR MAKING A BEVERAGE

[76] Inventor: Paul C. Gaskill, R.D. 1, Box 426, Dilliner, Pa. 15327

[21] Appl. No.: 366,052

[22] Filed: Apr. 6, 1982

Related U.S. Application Data

[63] Continuation-in-part of Ser. No. 254,859, Apr. 16, 1981, abandoned.

[51] Int. Cl.³ .................... A23F 3/18; A23F 5/26; B65D 33/01
[52] U.S. Cl. ........................................ 426/80; 99/287; 426/77; 426/82; 426/433; 426/435; 206/0.5; 422/266
[58] Field of Search ............... 426/433, 435, 431, 432, 426/434, 425, 436, 80, 77, 81, 82, 474, 477, 519; 206/0.5; 422/261, 278, 279, 283, 266, 266 H; 423/658.5; 260/705; 210/460; 99/287, 321, 323; 366/101

[56] References Cited

U.S. PATENT DOCUMENTS

| | | | |
|---|---|---|---|
| 994,975 | 6/1911 | Calkin et al. | 426/474 |
| 1,489,806 | 4/1924 | Anderson | 426/77 |
| 2,123,054 | 7/1938 | Lamb et al. | 426/80 |
| 2,181,839 | 11/1939 | Tressler | 426/474 |
| 2,437,968 | 3/1948 | Timberlake | 426/432 |
| 2,783,149 | 2/1957 | Epstein | 426/432 |
| 3,193,388 | 7/1965 | Conrey | 426/80 |
| 3,492,671 | 1/1970 | Hovey | 426/477 |
| 3,833,740 | 9/1974 | Schmidt | 426/80 |
| 3,862,347 | 1/1975 | Thijssen | 426/434 |
| 3,935,318 | 1/1976 | Mihailide | 426/80 |
| 4,186,215 | 1/1980 | Buchel | 426/477 |
| 4,306,492 | 12/1981 | Zimmermann | 426/80 |

FOREIGN PATENT DOCUMENTS

| | | | |
|---|---|---|---|
| 323436 | 1/1930 | United Kingdom | 426/82 |
| 1189821 | 4/1970 | United Kingdom | 423/658.5 |

Primary Examiner—Steven L. Weinstein

[57] ABSTRACT

An improved beverage infusion device and a method of rapid brewing an infusible beverage substance such as fresh, fine ground, roasted coffee by air agitation in an air-water chamber. The wall of the chamber is constructed of a fine porous filtering material that confines particles of coffee during agitation thereof with water of an amount necessary for brewing either one or more serving portions of coffee. An air conduit directs air underneath the coffee particles accumulated in the air-water chamber that is immersed in hot water. The hot water enters the porous wall of the air-water chamber, saturating the coffee particles. One or more intermittent burst of air are directed by the conduit under the coffee particles thereby momentarily suspending the coffee particles in the water, and agitating the coffee particles and the water. The water solubles of the coffee are extracted rapidly and mixed with the water to create a beverage.

6 Claims, 10 Drawing Figures

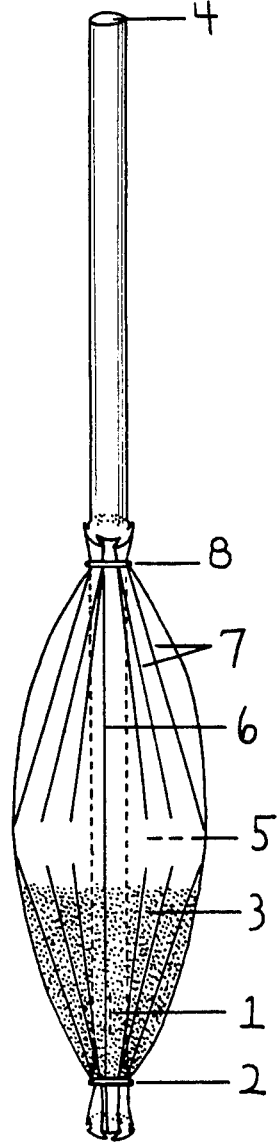
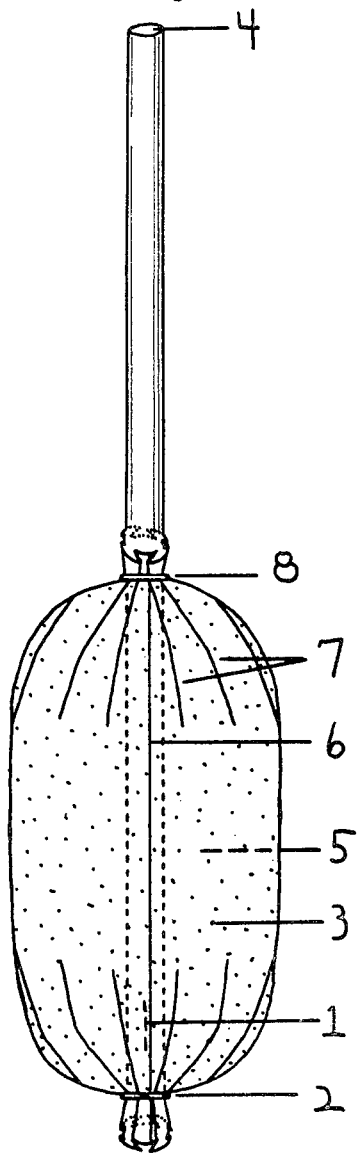

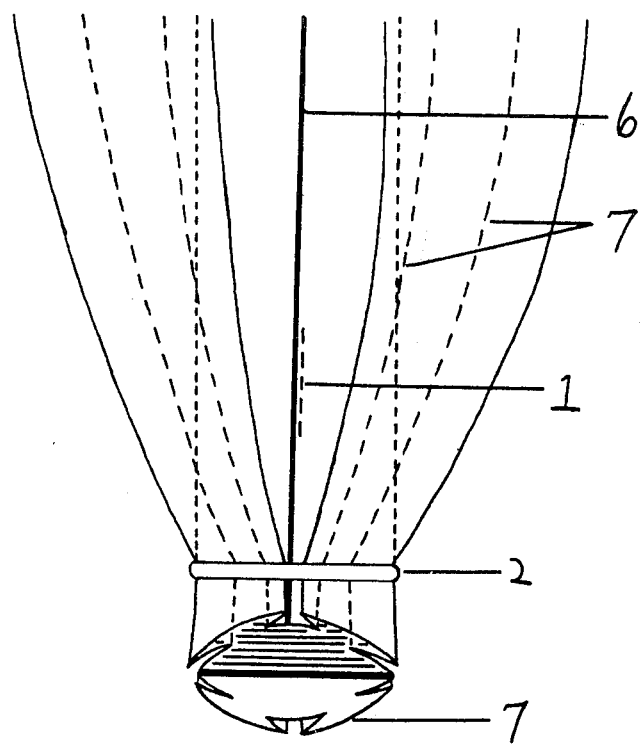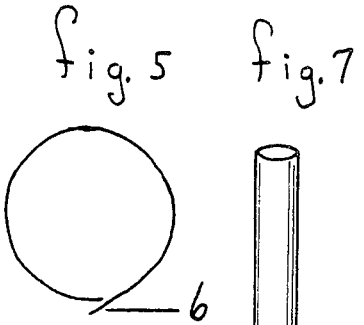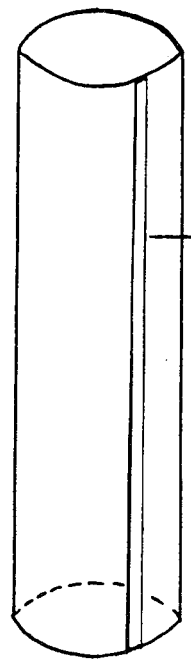

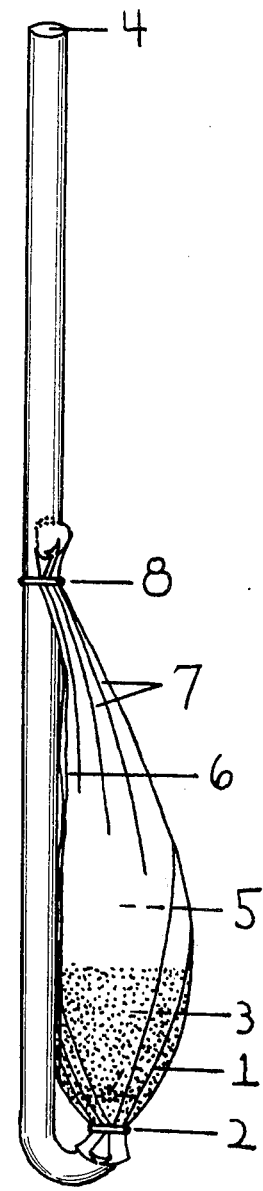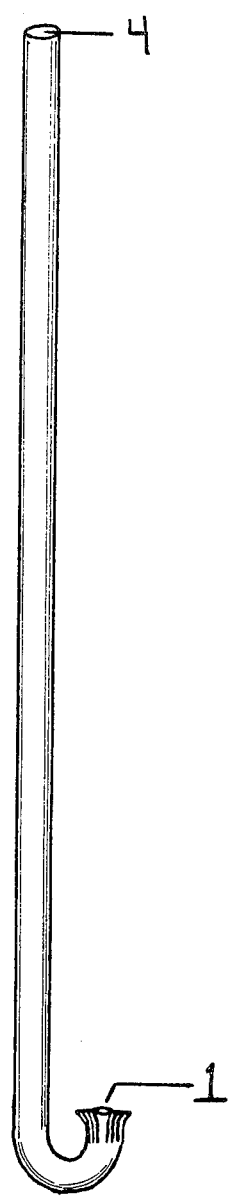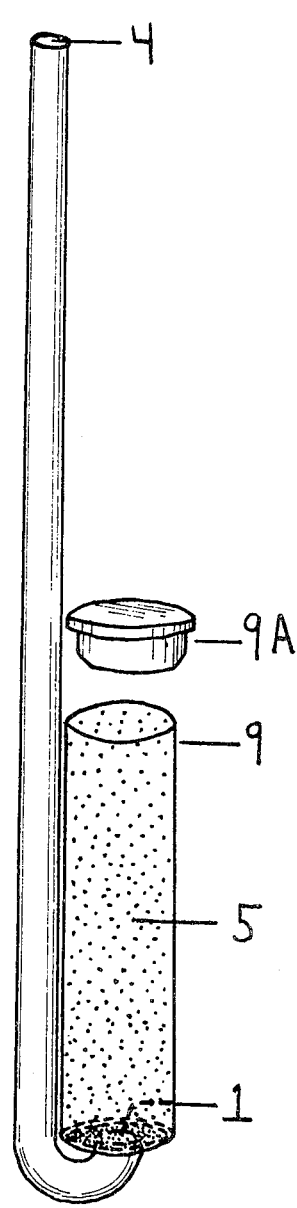

APPARATUS AND METHOD FOR MAKING A BEVERAGE

This application is a continuation-in-part application of application Ser. No. 254,859, filed Apr. 16, 1981, now abandoned.

The invention relates to apparatus and a method for making a beverage by air agitating an infusible beverage substance with potable liquid in an air-liquid chamber made of a filtering material porous to the liquid and confining the beverage substance. A conduit or air tube is connected to the chamber and directs one or more intermittent bursts of air under the beverage substance that is accumulated by gravity to cover the conduit. The air momentarily suspends the beverage substance in the liquid at least some of which has entered the porous chamber; and air agitates the liquid and the suspended beverage substance. The fluid solubles of the beverages substance rapidly become extracted and mixed with the liquid to create a beverage infusion. The invention is useful for making by infusion, one or more serving portions of a beverage and particularly a beverage of hot water and solubles from fresh, fine ground coffee.

The invention is characterized by a method comprising the steps of:

A method for making a beverage by infusion, comprising the steps of: Confining an infusible beverage substance within a chamber which is porous to potable liquid, immersing the chamber in a potable liquid, introducing air under the beverage substance which is accumulated by gravity, and passing the air through the liquid that is within the chamber to momentarily suspend the beverage substance within the liquid that is in the container and air agitate the beverage substance and the liquid, so that edible solubles of the beverage substance are blended with the liquid.

Further, the invention comprises a beverage making infusion device to mix by air agitation an infusible beverage substance.

A better understanding of the invention is apparent by way of example from the following description:

FIG. 1 is an elevation view of one form of apparatus of the invention, illustrating a conduit and rucks or pleats in an air-liquid chamber;

FIG. 2 is an elevation view of the apparatus according to FIG. 1, illustrating the chamber in an air filled condition causing it to distend;

FIG. 3 is an enlarged isometric view of a portion of the apparatus according to FIG. 1, illustrating a clamp ring that secures and closes the chamber to a closed end of the conduit;

FIG. 4 is an isometric view of the clamp ring according to FIG. 3;

FIG. 5 is a plan view of the top of the chamber according to FIG. 3, illustrating an overlap seam prior to being sealed;

FIG. 6 is an isometric view of the air-water chamber according to FIG. 3, illustrating a sealed seam prior to forming the rucks or pleats;

FIG. 7 is an elevation view of the conduit according to FIG. 3, illustrating a sealed lower end;

FIG. 8 is an elevation view of another form or apparatus according to the invention, illustrating a conduit external to an air water chamber;

FIG. 9 is an elevation view of a conduit portion of the apparatus according to FIG. 8;

FIG. 10 is an exploded perspective view of another form of the apparatus of the invention.

FIGS. 1, 2, 3, and 7 illustrate a conduit in the form of a common drinking straw made of plastics material, open at a top end, to form an air admitting opening 4, and closed at a lower end by plugging, heat sealing or adhesive sealing. One or more small slits 1 are cut in the wall of the conduit to serve as checks for allowing air under pressure to exit the conduit and prevent entrance of particles of an infusible beverage substance such as ground coffee. In practice, the slits 1 are spaced one-half inch from the seal in the lower end of the straw. An air-liquid chamber or air-water chamber 5 is made from a piece of conventional coffee filter paper, four and one-half inches square. The paper is formed into a roll with an overlap seam at the adjacent sides 6. The seam is closed by sewing or sealing with an adhesive. The conduit is inserted inside the rolled paper form. The lower end of the rolled paper form is drawn radially toward the conduit and is secured to the conduit by banding, tying, or similar means such as by a clamp ring 2 of a conventional type. Before closing the top of the rolled form, the form is filled with a measured or portioned amount of ground coffee 3. Two teaspoons of coffee are used in practice. The top of the rolled form is then drawn radially toward and secured to the conduit by another ring clamp 8. The secured paper thereby forms a closed air-liquid chamber 5 confining the coffee, with pleats or rucks 7 formed when the paper is drawn toward the conduit. The coffee accumulates by gravity to cover the slits 1 that are inside the chamber 5.

FIGS. 8 and 9 show another form of conduit fabricated from a rigid tube of metal or rigid plastic, or from a flexible plastic. The component parts of the conduit shown in FIG. 8 that are similar to the conduit shown in FIGS. 1–7 have similar numbers. The conduit shown in FIG. 8 is curved adjacent its lower end which has been flattened. If the conduit is rigid, the flattened end remains substantially sealed. If the conduit is flexible, the flattened end is sealed by heat or adhesive. The slits 1 extend through the flattened, sealed end and into the conduit adjacent such end. The conduit is secured externally of the chamber 5 by the clamp 8. The portion of the conduit having the slits 1 is internally of the lower end of the chamber and secured by the clamp 2. The quantity of coffee 3 accumulates by gravity to cover the slits 1. If the conduit is rigid, the lower end may be flattened to narrow the open end to a narrow slit, thereby eliminating the need for additional slits.

FIG. 10 illustrates an air fillable chamber 5, that does not distend, fabricated from a rigid filtering material such as sintered bronze, commonly used as a gasoline filter available from General Motors Corporation, Flint, Mich. 48556, part number GM 7013404; or from Bendix Company, Providence R.I. 02916, part number CG 13. The chamber is porous also to water and may be filled partially with coffee. A frictionally secured, removable cover 9A confines the coffee (not shown). The conduit also of bronze, has a lower open end secured to the lower end of the chamber, by brazing, for example. Checks 1, to prevent entrance of coffee, are provided by openings in either a porous bottom wall of the chamber 5 or a fine mesh screen secured over the open lower end of the conduit.

In operation, the chamber 5 of the apparatus is immersed in a container (not shown) containing hot water, water enters the air-water chamber 5 through the pores in the filtering wall, saturating the ground coffee 3. In practice, the container is a single serving, drinking cup. Then the user blows with his or her mouth into the air tube and air under pressure is admitted into the opening 4 and forced through the checks 1. Air is directed into the chamber 5 underneath the saturated ground coffee 3. The air being trapped under the coffee 3 diffuses and tries to escape. The air bubbles formed are of lesser density than that of the coffee and water, and rises upward violently carrying coffee particles and water solubles with it. The coffee particles are put into momentary suspension in the water within the chamber 5, and water and edible water solubles are agitated and are forced through the porous wall to blend with the water in the container. The air supply is then ceased, and the device is manipulated by holding the upper portion of the air tube by holding the upper portion of the air tube. Water trying to fill the void, made by the trapped air in the air water chamber 5, passes through the porous wall and washes the coffee particles down, covering the air checks 1, and the air introduction intermittently or alternately, continued for a single span of time, until desired concentration is reached.

Although preferred embodiments of the invention are disclosed, other embodiments and modifications are within the scope of the invention. For example, the air for agitation may be supplied by any well known source, such as a mechanical air supply pump. The amount of potable liquid or infusible beverage substance is selectively variable. The potable liquid in which the container is immersed may be still or flowing.

I claim:

1. A method for making a beverage by infusion, comprising the steps of: confining an infusible beverage substance within a chamber which is porous to potable liquid, securing said chamber to a conduit, said conduit comprising a hollow conduit dimensioned to be hand held with an opening at one end opposite from said chamber, said opening being dimensioned to allow the opening to be received by a human mouth, said conduit having an air exit passage contained within or adjacent the chamber, said air exit passage allowing fluid communication between the conduit and the chamber to allow air under pressure to exit the conduit and enter the chamber, the infusible beverage substance partially filling the chamber to cover the air exit passage, immersing the chamber in a potable liquid, blowing air by mouth into the conduit and outwardly of the air exit passage of the conduit against the beverage substance, and permitting diffusion of the air through the liquid that is within the chamber to momentarily suspend the beverage substance within the liquid that is in the chamber and air agitate the beverage substance and the liquid, so that edible solubles of the beverage substance are blended with the liquid.

2. A beverage making infusion device to mix by air agitation an infusible beverage substance with a potable liquid, comprising: a hollow conduit dimensioned to be hand held, a mixing chamber of liquid porous material secured to the conduit and either containing or being adjacent an air exit passage of the conduit, the chamber being partially filled with an infusible beverage substance accumulated and covering the exit passage, and an opening in the conduit at one end of the conduit opposite from said chamber, said opening dimensioned to allow the opening to be received by a human mouth and to admit air blown by mouth and under pressure, and the exit passage allowing fluid communication between the conduit and the chamber to allow air under pressure to exit the conduit, diffuse through and against the infusible substance and to agitate the infusible substance together with a potable liquid that is in the chamber and permitted to pass through the porous material.

3. The structure as recited in claim 2, wherein, the conduit is a common drinking straw, said drinking straw is sealed at its end remote from the open end, and said air exit passage comprises one or more slits through the drinking straw.

4. The structure as recited in claim 3, wherein, the porous material is filtering material.

5. The structure as recited in claim 2, wherein, the porous material is filtering material.

6. The structure as recited in claim 2, wherein, the air exit passage comprises one or more slits in the conduit.

* * * * *